United States Patent [19]
Ichiyama

[11] Patent Number: 6,036,369
[45] Date of Patent: Mar. 14, 2000

[54] FLUID DYNAMIC PRESSURE BEARING AND MOTOR AND MAGNETIC DISK APPARATUS USING FLUID DYNAMIC PRESSURE BEARING

[75] Inventor: Yoshikazu Ichiyama, Ukyoeku, Japan

[73] Assignee: Nidec Corporation, Kyoto, Japan

[21] Appl. No.: 09/128,202

[22] Filed: Aug. 3, 1998

Related U.S. Application Data

[62] Division of application No. 08/618,971, Mar. 20, 1996, Pat. No. 5,791,784.

[30] Foreign Application Priority Data

Apr. 10, 1995 [JP] Japan ................................ 7-110000

[51] Int. Cl.$^7$ .................................................. F16C 33/74
[52] U.S. Cl. ................................................................ 384/119
[58] Field of Search ................................ 384/119, 124, 384/112, 113, 115, 114

[56] References Cited

U.S. PATENT DOCUMENTS

| | | |
|---|---|---|
| 5,403,098 | 4/1995 | Yasui et al. . |
| 5,558,443 | 9/1996 | Zang . |
| 5,558,445 | 9/1996 | Chen et al. . |
| 5,559,382 | 9/1996 | Chen et al. . |
| 5,722,775 | 3/1998 | Thijsse et al. . |

Primary Examiner—Lenard A. Footland
Attorney, Agent, or Firm—McCormick, Paulding & Huber LLP

[57] ABSTRACT

A fluid dynamic pressure bearing has a shaft member, a sleeve member which is relatively rotatable to this shaft member and radial and thrust fluid dynamic pressure bearings. A lubricating oil retaining channel is provided to retain lubricating oil by the capillarity, a part of the retaining channel is open to the atmosphere and the other part is communicated with the fluid dynamic pressure bearings. The retaining channel can be formed on the shaft member. Further, a fluid dynamic pressure bearing in such the construction is favorably used in a motor and a disk driving apparatus.

6 Claims, 7 Drawing Sheets

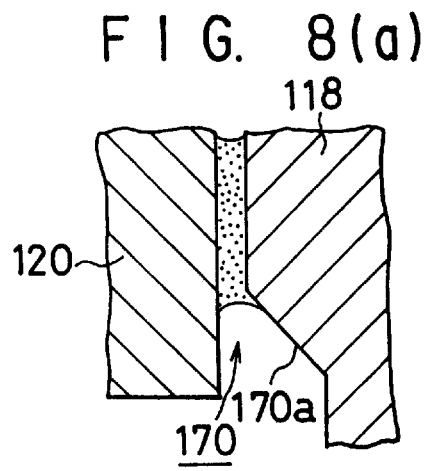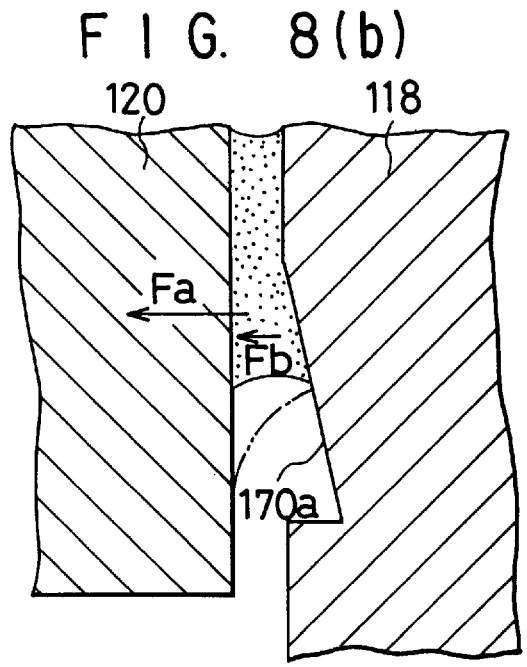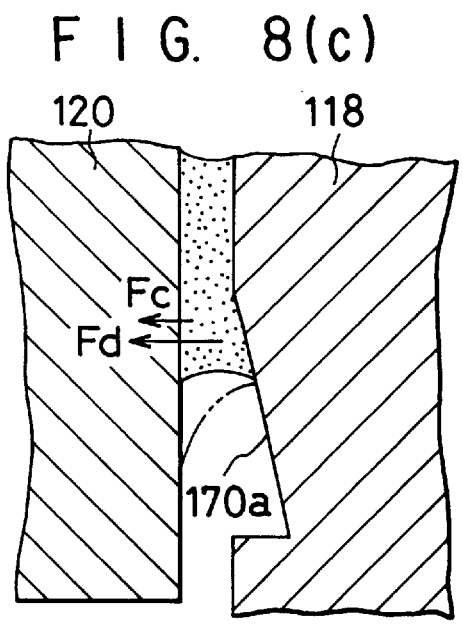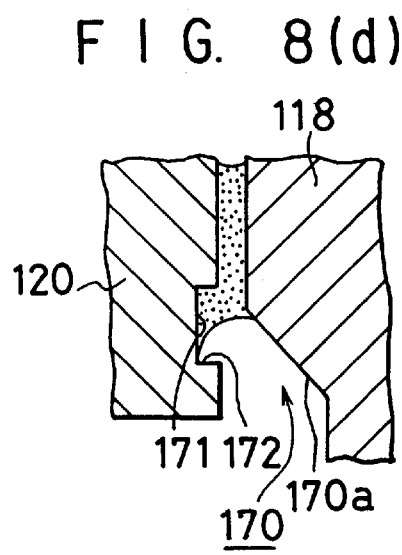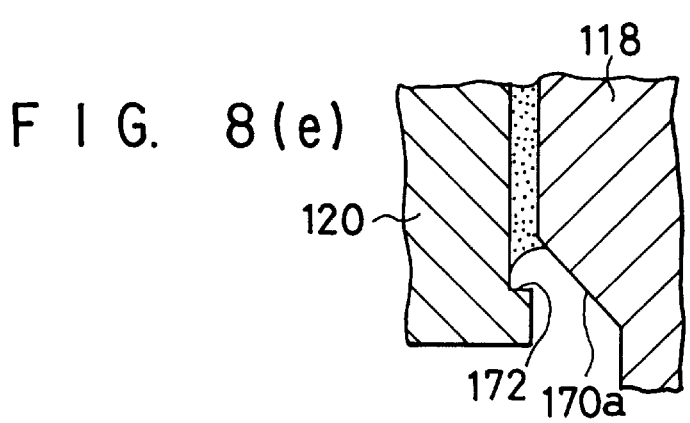

FLUID DYNAMIC PRESSURE BEARING AND MOTOR AND MAGNETIC DISK APPARATUS USING FLUID DYNAMIC PRESSURE BEARING

This is a division of Ser. No. 08/618,971, filed Mar. 20, 1996, now U.S. Pat. No. 5,791,784.

BACKGROUND OF THE INVENTION

1. Field of the Invention

The present invention relates to a fluid dynamic pressure bearing using lubricating fluid, and a motor and a disk driving apparatus equipped with this fluid dynamic pressure bearing.

2. Description of the Related Art

A fluid dynamic pressure bearing using fluid pressure of lubricating oil filled between a shaft member and a sleeve member has been used so far to support both the shaft member and the sleeve member relatively rotatable to each other. This type of fluid dynamic pressure bearing is provided with thrust fluid dynamic pressure bearing means to support thrust load and radial fluid dynamic pressure bearing means to support radial load between the shaft member and the sleeve member. When such a fluid dynamic pressure bearing is used in a motor, either the shaft member or the sleeve member is fixed. That is, if the shaft member is fixed, a motor becomes of stationary shaft type and if the sleeve member is fixed, a motor becomes of rotary shaft type.

However, this type of fluid dynamic pressure bearing has such problems which are to be solved. That is, a conventional fluid dynamic pressure bearing so far in use is able to retain only minimum required lubricating oil and lubricating oil may decrease due to leakage, evaporation, etc. as a result of use, and the life of bearing may be expired in a relatively short period. Further, as there is no sufficient space for reserving lubricating oil, it was necessitated to accurately measure oil quantity to be filled in thrust fluid dynamic pressure bearing means and/or radial dynamic pressure bearing means and therefore, the conventional fluid dynamic pressure bearing was a bearing having an extremely less allowable margin when temperature fluctuation and secular change were taken into consideration.

SUMMARY OF THE INVENTION

The present invention has been made in view of the fact described above and it is an object of the present invention to provide a fluid dynamic pressure bearing which is capable of reserving sufficient lubricating oil, increasing the allowable tolerance for lubricating oil charging volume and assuring use over a long period of time.

Another object of the present invention is to provide a fluid dynamic pressure bearing which is capable of checking or supplying lubricating oil from the outside of an equipment which adopted this type of dynamic pressure bearing without disassembling the equipment when it is operated over a long period of time and a motor and a disk driving apparatus using this type of bearing.

It is another object of this invention to provide a hydrodynamic bearing capable of preventing or reducing leakage of an lubricating oil to outside.

According to the present invention, in a fluid dynamic pressure bearing comprising a shaft member and a sleeve member which is relatively rotatable to the shaft member, thrust fluid dynamic pressure bearing means and radial fluid dynamic pressure bearing means provided between the shaft member and the sleeve member, and lubricating fluid in the thrust and radial fluid dynamic pressure bearing means are communicated each other, a lubricating fluid retaining channel is provided to retain lubricating fluid and has a space larger than a space between the thrust and radial fluid dynamic pressure bearing means but sufficiently small to retain lubricating fluid by the capillarity and at least a part of this retaining channel is open to the atmosphere and its other part is communicated with the thrust and/or radial fluid dynamic bearing means and a disk driving apparatus adopting this fluid dynamic pressure bearing are provided.

Further, according to the present invention, in a motor comprising a mounting member, a sleeve member fixed to the mounting member, a stator fixed to the sleeve member, a shaft member which is supported rotatably by thrust fluid dynamic pressure bearing means and radial fluid dynamic bearing means, a rotor mounted to the shaft member and a rotor magnet mounted to the rotor, a retaining channel for retaining lubricating fluid by the capillarity is provided to the shaft member, a part of the retaining channel is open to the atmosphere and the other part is communicated with the thrust and/or radial fluid dynamic bearing means. This lubricating fluid retaining channel may be provided on the sleeve member. Further, it is applicable not only to a rotary shaft type motor but also to a stationary shaft type motor. In this case, the lubricating fluid retaining channel is formed on the shaft member. Further, such the fluid dynamic bearing can be favorably applied to a disk driving apparatus.

In the fluid dynamic pressure bearing of the present invention, as the retaining channel is provided to retain such fluid as lubricating oil by the capillarity, this retaining channel functions as a fluid reservoir. Accordingly, if lubricating fluid in the radial and/or thrust fluid dynamic pressure beating means decreases, fluid retained in this retaining channel is supplied by the capillarity to the bearing means having a more fine gap successively and the bearing can be used for a long time without causing seizure due to oil decrease. Further, if much lubricating fluid is filled during manufacturing, excess lubricating fluid is retained in this retaining channel and therefore, lubricating fluid is prevented from leaking to the outside.

In the motor (the disk driving apparatus) of the present invention, as the retaining channel is provided to retain lubricating fluid by the capillarity, this retaining channel functions as a fluid reservoir. Accordingly, if lubricating fluid in the radial and/or thrust fluid dynamic pressure bearing means of the motor (the disk driving apparatus) decreases, the lubricating fluid retained in the retaining channel is supplied successively by the capillarity to the bearing means which has a more fine gap, the life of the radial and thrust fluid dynamic pressure bearing means are extended and the life of the motor (the disk driving apparatus) itself is also extended. Further, if much lubricating fluid is filled in these fluid dynamic pressure bearing means during manufacturing, excess lubricating fluid is retained in this retaining channel and prevented from leaking to the outside of the motor (the disk driving apparatus). Furthermore, as a part of the lubricating fluid retaining channel is open to the atmosphere, if air bubbles contained in lubricating fluid are expanded, the oil level in this retaining channel moves up and down to absorb increased oil pressure and the air may be discharged to the atmosphere through a part of this retaining channel in some case, preventing adverse effects of the bubbles contained in lubricating fluid. In addition, it becomes possible to initially pouring lubricating oil or to supply oil when an equipment is in operation through the part of the retaining channel opened to the atmosphere.

A hydrodynamic bearing according to this invention comprises a shaft member; a sleeve member rotatable in relative to the shaft member; and radial hydrodynamic bearing means intervening between the shaft member and the sleeve member, the radial hydrodynamic bearing means including a lubricating fluid, at least a part of the radial hydrodynamic bearing means being open to atmospheric air, that open part having migration prevention means for preventing migration of a lubricating fluid caused by centrifugal force.

The migration prevention means can prevent the lubricating fluid from flowing out, thus making it possible to prevent burning of the bearing.

BRIEF DESCRIPTION OF THE DRAWINGS

FIG. 8A is an enlarged cross-sectional view of a tapered portion;

FIG. 8B is a diagram for explaining how a lubricating oil spreads when a shaft member is fixed and a sleeve portion rotates;

FIG. 8C is a diagram for explaining how a lubricating oil spreads when the shaft member rotates and the sleeve portion is fixed;

FIG. 8D shows the structure in which a circumferential groove is formed at the portion facing the tapered portion;

FIG. 8E shows the structure where only a step is formed and no circumferential groove is provided;

DETAILED DESCRIPTION OF THE PREFERRED EMBODIMENTS

Preferred embodiments of a fluid dynamic pressure bearing and a motor and a disk driving apparatus adopting this fluid dynamic pressure bearing will be described in the following in detail with reference to the attached drawings.

Figure 1:
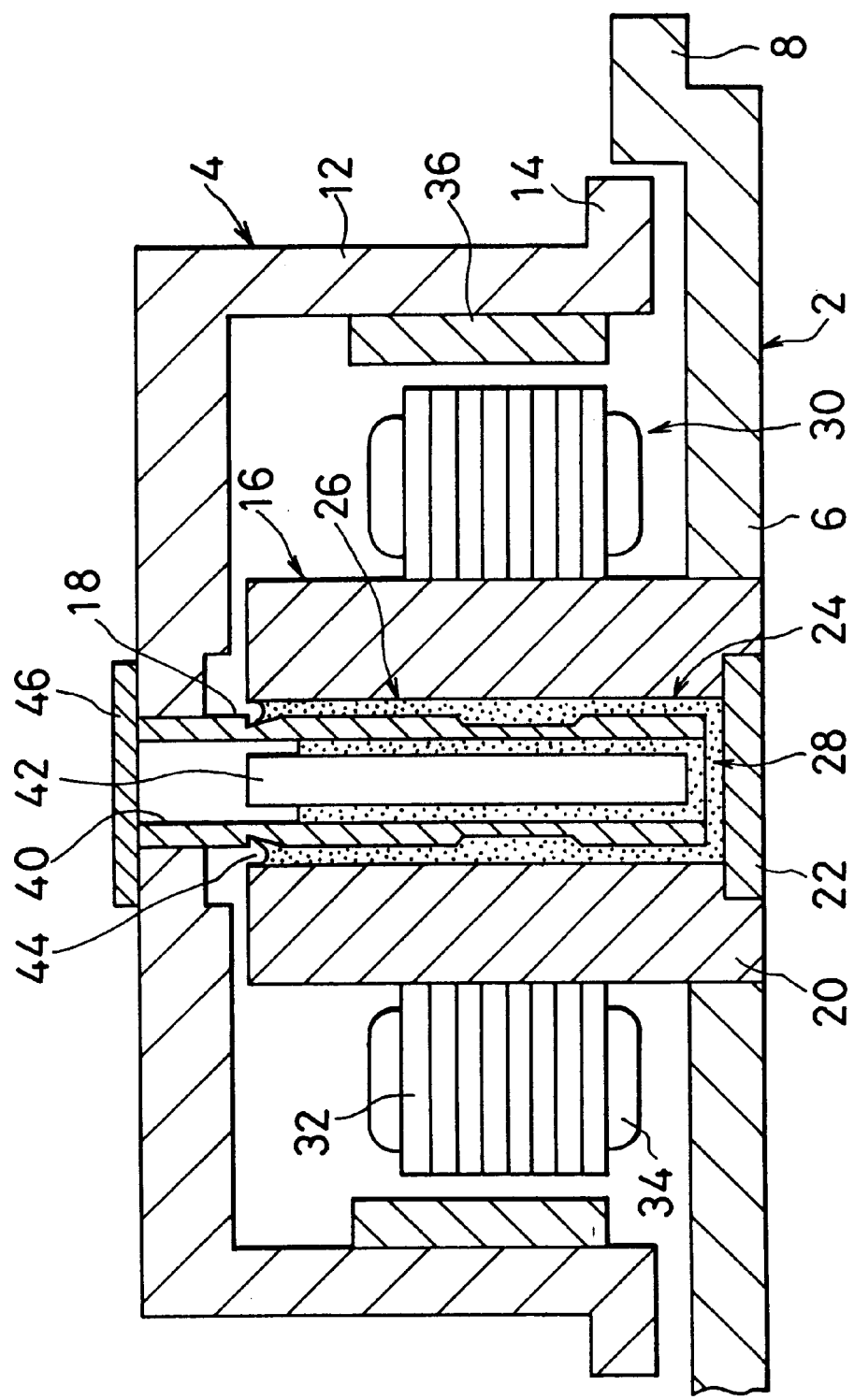
FIG. 1 is a cross-sectional view showing a fluid dynamic pressure bearing according to the present invention and an embodiment of a motor adopting this bearing.

FIG. 1 shows an embodiment of a fluid dynamic pressure bearing according to the present invention and a motor adopting this bearing. In FIG. 1, an illustrated motor is equipped with a housing 2 (functions as a bracket) and a rotor 4 mounted rotatably to this housing 2. The housing 2 has a cylindrical housing main body 6 and a flange 8 is provided to the outer circumference of the housing main body 6 in one flange 8 is fixed to a base member of a disk driving apparatus which rotates and drives such a recording disk as a magnetic disk by screws or other means.

Although not illustrated, a disk driving apparatus has generally a housing defining a disk chamber which accommodates a head assembly. This housing is comprised of a base member and a cover member which is mounted to the base member. In the disk chamber, a recording disk such as a magnetic disk is provided and this disk is rotated in the specified direction by the motor. Further, a means to write and/or read information in/from a disk, for instance, a magnetic head is provided in the disk chamber.

The rotor 4 has a cup-shaped hub main body 10 and at the open end of this hub main body 12, a disk table 14 is provided projecting to the outward in the radial direction. A recording disk (not shown) is placed on the disk table 14 of the hub main body 12.

A fluid dynamic pressure bearing 16 is provided between the housing 2 and the hub 4. The illustrated fluid dynamic pressure bearing 16 is comprised of a shaft member 18 and a sleeve member 20 which is rotatable relatively to this shaft member 18. One end of the sleeve member 20 is fixed to the housing main body 6 and its other end is substantially extending upward vertically from the housing main body 6. A bottom plate 22 is provided at one end of the sleeve member 20 and one end of the sleeve member 20 is kept closed by this bottom plate 22.

The shaft member 18 is provided in the sleeve member 20 relatively rotatable. One end of this shaft member 18 is fixed to the rotor 4 and rotates in one unit with the rotor 4. The other end of the shaft member 18 is extending downward to the bottom plate 22 from the rotor 4. In this embodiment, a pair of radial fluid dynamic pressure bearing means 24 and 26 are provided with a space left between them in the axial direction (in the upward and the downward directions in FIG. 1) between the outer surface of the shaft member 18 and the inner surface of the sleeve member 20. The radial fluid dynamic pressure bearing means 24 and 26 are comprised of, for instance, herringbone radial fluid dynamic pressure grooves (not shown) provided on the outer surfaces of the shaft members 24 and 26. These radial fluid dynamic pressure grooves may be provided on the inner surface of the sleeve member 20 instead of the outer surface of the shaft member 18. A thrust fluid dynamic pressure bearing means 28 is provided between the free end surface (the lower end surface) of the shaft member 18 and the inner surface of the bottom plate 22. The thrust fluid dynamic pressure bearing means 28 is comprised of, for instance, a spiral thrust fluid dynamic pressure groove (not shown) formed on the inner surface of the bottom plate 22. This thrust fluid dynamic pressure groove may be formed on the free end surface of the shaft member 18 instead of the inner surface of the bottom plate 22. As seen from FIG. 1, lubricating oil is filled continuously in a pair of the radial fluid dynamic pressure bearing means 24 and 26 and the thrust fluid dynamic pressure bearing means 28.

A stator 30 is mounted on the outer surface of the sleeve member 20. This stator 30 is comprised of a stator core 32, which is formed by laminating a plurality of core plates, and a coil 34 which is wound round this stator core 32 as required. A rotor magnet 36 is provided opposing to the stator core 32 and this rotor magnet 36 is mounted on the inner surface of the hub main body 12.

The fluid dynamic pressure bearing means 16 is further provided with a retaining channel for retaining lubricating oil. In this embodiment, this retaining channel is comprised of a hole 40 which is provided at the center of the shaft member 18. The hole 40 is provided at the center of the shaft member 18 to penetrate it in the axial direction and therefore, one end of the retaining channel is opened to the atmosphere through one end surface of the shaft member 18 and the other end is communicated with the thrust fluid dynamic pressure bearing means 28 through the other end surface of the shaft member 18.

In this embodiment, a bar-shape member 42 is provided in the hole 40 comprising the retaining channel to retain lubricating fluid by the capillarity. The bar-shape member 42 as a filling member has the nearly circular cross section and a plurality of bosses on the surface, and when inserted into the hole 40, it is fixed while maintaining a specified space between the inner surface of the hole 40 and the outer surface of the bar-shape member 42. The reason for providing the bar-shape member 42 in the hole 40 is to retain lubricating oil between the inner surface of the shaft member 18 and the outer surface of the bar-shape member 42 by the capillarity by making the space between these inner and outer surfaces small. It is important to set the space of the fluid retainer for retaining lubricating fluid, that is, the space between the outer surface of the bar-shape member 42 and the inner surface of the hole 40 larger than the space between the bearings of the thrust fluid dynamic pressure bearing means 28 and the radial fluid dynamic pressure bearing means 24, 26 and so small that lubricating oil can be retained in the space by the capillarity. As the space of the bearings is about several micron meter ($\mu$m), the space in the retaining channel should be set at several tens micron meter ($\mu$m). Thus, if oil decreases in the thrust and/or radial fluid dynamic pressure bearing means, oil is automatically supplied successively by the capillarity from the retaining channel.

Figure 2:
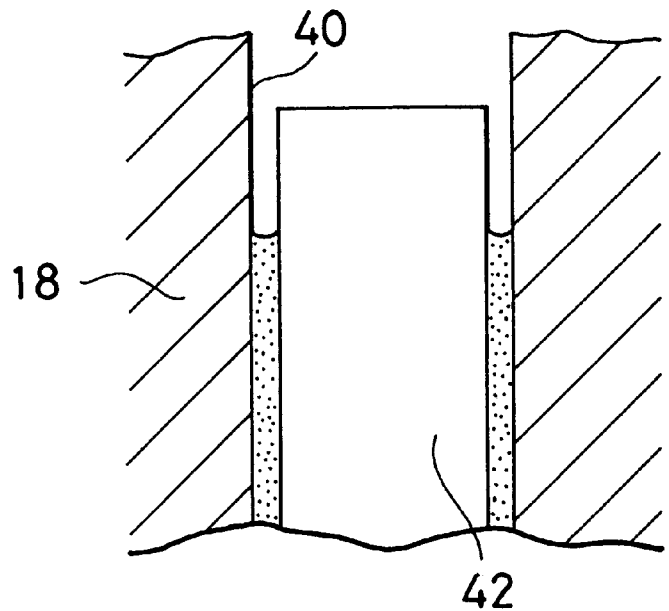
FIG. 2 is a partially enlarged cross-sectional view showing a part of a bar-shape member of the motor shown in FIG. 1 and its vicinity.

In connection with the bar-shape member 42, it is further constructed as shown below. That is, it is better that one end of the bar-shape member 42 is extending from one end of the shaft member 18, preferably to about ¼ from one end of the shaft member 18. When thus constructed, the sectional area of the bar-shape member 42 becomes relatively large at one end of the hole 40 as shown by the partially enlarged view in FIG. 2, air bubbles generated in oil are released at this large sectional area, oil and air bubbles are effectively separated and the air only is discharged to the outside through the opening at one end of the hole 40. Further, as the bar-shape member 42 is not extended to one end of the shaft member 18 but extended only to the middle point, even when air bubbles, shape member 42 and the oil level goes up, oil does not leak to the outside from the one end opening.

Further, as oil is retained by the capillarity, it is desirable to set a space of the fluid retainer between the inner surface of the shaft member 18 and the outer surface of the bar-shape member 42 at less than about 0.1 mm. Because of this, it is better to form a hole 40 in diameter of about 1 mm on the shaft member 18 and insert and fix a bar-shape member 42 in diameter of about 0.8 through 0.9 mm into this hole 40.

At one end of the shaft member 18, a lid member 46 is provided. This lid 46 is desirable to have a characteristic that air can pass through it but oil does not substantially pass through and can be made of, for instance, an oil repellent processed porous material. The lid member 46 provided makes it possible to discharge the air in the retaining channel but prevent leakage of oil through the opening. Even when a screw having an air venting means by partially cutting it is used, its function is the same as that of the lid member 46. Even in this case, if an oil repelling action is applied to the air venting means by coating an oil repellent, for example, the oil repellent made from fluorocarbon resin or teflon, it becomes further easy to assure the function of the lid 46.

On such the motor as described above, when current is applied to the coil 34 of the stator 30 as required, the rotor 4 is rotated in the specified direction by the mutual magnetic action of the stator 30 and the magnet 36. When the rotor 4 is rotated, oil pressure existing in the radial fluid pressure bearing means 24 and 26 is increased and these radial fluid pressure bearing means 24 and 26 support radial load acting on the shaft member 18 via such the oil layer. Further, the oil pressure existing in the thrust fluid dynamic pressure bearing means 28 is increased and the thrust fluid dynamic pressure bearing means 28 supports thrust load acting on the shaft member 18 via this oil layer.

If oil in the radial and/or thrust fluid pressure bearing means 24, 26 and 28 decreases as a result of use of a motor, etc., lubricating oil retained in the hole 40 is supplied to the thrust fluid dynamic pressure bearing means 28, which has a fine space, through the other end of the hole 40 or to the radial fluid dynamic pressure bearing means 24 and 26 further passing through the thrust fluid dynamic pressure bearing means 28. Thus, oil is supplied to the radial and/or thrust fluid dynamic pressure bearing means 24, 26 and 28 successively and the life of the fluid dynamic pressure bearing 16 can be extended and used over an extended period of time.

Further, if oil is excessively filled in the bearing when manufacturing a motor, excess oil is retained in the hole 40 of the shaft member 18. This hole 40, that is, the oil retaining channel functions as an oil reservoir and oil does not leak to the outside. Oil thus retained is used as supply oil as described above.

If oil in the hole 40 of the shaft member 18 remarkably decreases, oil can be supplied in the following manner. That is, first, open one end of the retaining channel by removing the lid member 46. Then, fill new oil to the retaining channel through this opening and then, close the end surface of the shaft member 18 again by the lid member 46. Oil can be supplied in the manner as described above. Further, it is also possible to check quality and quantity, etc. of oil by removing the lid member 46 without disassembling the entire fluid dynamic pressure bearing.

Figure 3:
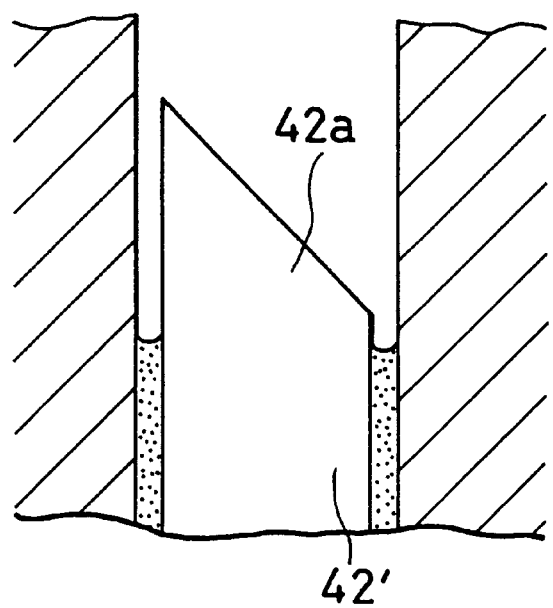
FIG. 3 is a partially enlarged cross-sectional view showing a part of a deformed example of the bar-shape member and its vicinity.

On end of a bar-shape member 42' can be constructed as shown in FIG. 3. In FIG. 3, a taper portion 42a is provided at one end of the bar-shape member 42'. In this example, the taper portion 42a was formed by diagonally cutting one end of the bar-shape member 42' and the cross-section of the taper portion 42a decreases gradually toward one end. When the taper portion 42a is provided at one end (the end opposite to the end facing the thrust fluid dynamic pressure bearing means) of the bar-shape member 42', oil and air are smoothly separated at this end.

Figure 4:
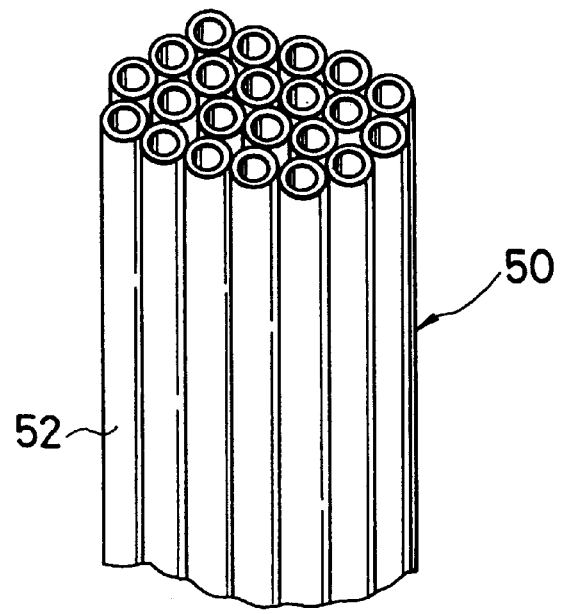
FIG. 4 is a partially enlarged perspective view showing another deformed example of the bar-shape member.

What is shown in FIG. 4 may be used as a filling member. In the example shown in FIG. 4, a filling member 50 is made of a plurality of thin hollow pipes 52 bundled in a cylindrical shape. This filling member 50 is provided in the hole 40 of the shaft member 18 instead of the slender cylindrical bar-shape member 42 shown in FIG. 1. Even when the filling member 50 shown in FIG. 4 is used, the inner diameter of the hollow pipes 52, spaces adjacent hollow pipes 52 and spaces between the hollow pipes 52 and the inner surface of the shaft member are to be set larger than the space between the bearing means 24 and 26 and smaller so as to be able to retain oil by the capillarity. It is better to select this space aiming at several tens micron meter ($\mu$m). Further, if the dimensional data selecting standard is the same, thin bar materials when bundled are usable for the hollow pipe 52.

Figure 5:
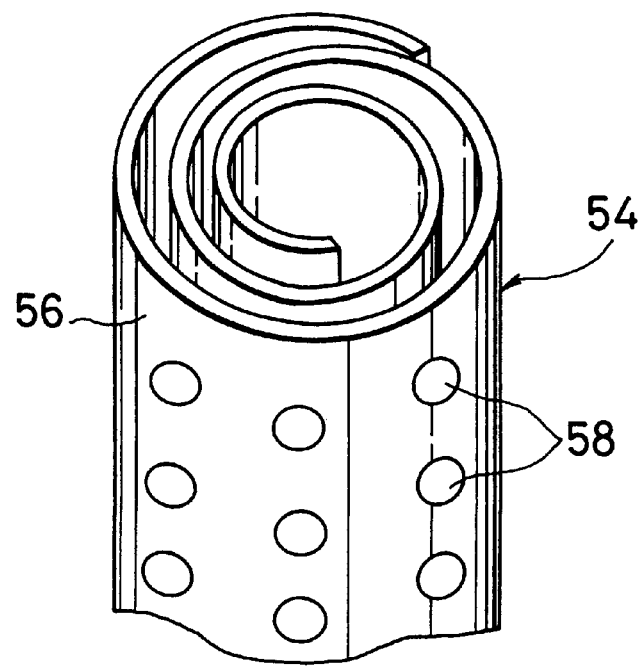
FIG. 5 is a partially enlarged perspective view showing another deformed example of the bar-shape member.

Further, what is shown in FIG. 5 is also usable as a filling member. In FIG. 5, a sheet member 56 has a plurality of bosses in several tens $\mu$m and when this sheet is rolled and overlapped, a specified space is formed in the rolled and overlapped sheet. This rolled sheet is used as the filling member 54. In the space thus produced in the rolled sheet member 56 and the space between the outer surface of the sheet member 56 and the inner surface of the hole 40 (these spaces act as a fluid retainer to retain oil), oil is retained by the capillarity and the same effect as the filling member shown in FIGS. 1 and 4 is achieved. In this example, to assure the automatic oil supply it is important to set the gap of the fluid retainer to retain oil (the gap of the space) larger than the gap of the thrust and radial fluid dynamic pressure bearing means.

In the embodiment shown in FIG. 1, the oil retaining channel is provided on the shaft member 18 which rotates in one unit with the rotor 4 but the retaining channel may be provided on the sleeve member 20 instead of the shaft member 18. Further, if the oil retaining channel is provided on the sleeve member 20, it is desirable to open a part of the retaining channel to one end surface (the lower end surface in FIG. 1) of the sleeve member 20 and open the other end between a pair of the radial fluid dynamic pressure bearing means 24 and 26.

In the embodiment shown in FIG. 1, the fluid dynamic pressure bearing applied to a rotary shaft type motor has been explained but it is also similarly applicable to a stationary shaft type motor.

Figure 6:
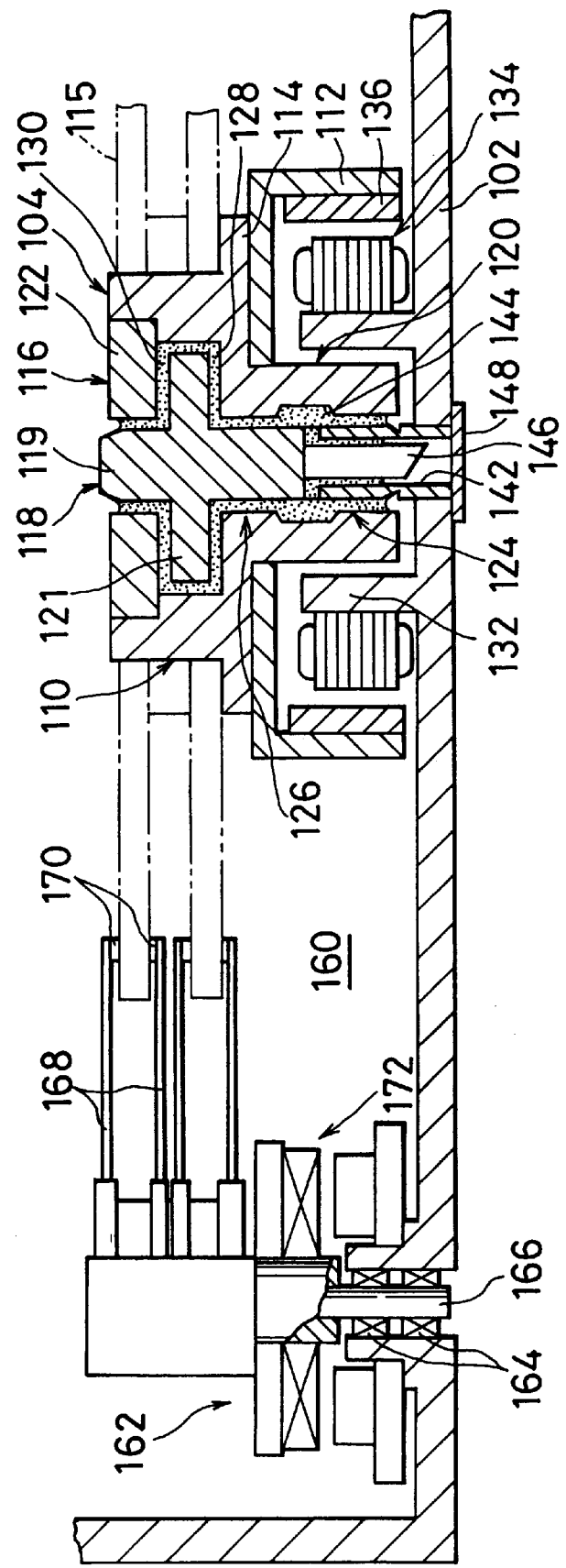
FIG. 6 is a cross-sectional view showing a fluid dynamic pressure bearing according to the present invention and an embodiment of a disk driving apparatus adopting this bearing.

In FIG. 6, a motor shown has a housing 102 and a rotor 104 which is mounted rotatably to this housing 102. This housing 102 may be a motor bracket or a base member of a disk driving apparatus.

In this embodiment, the housing 102 is a base member partially defining a disk table 160 and a cover member (not shown) is mounted to this base member. This base member is provided with a supporting means 162 with a specified space left from a motor. The supporting means 162 has a shaft member 166 mounted rotatably via a pair of bearings 164 and a supporting arm 168 is mounted to this shaft member 166. At the end of the supporting arm 168, a magnetic head means 170 is mounted for recording and/or reading information on/from a disk member which will be described later. Further, in connection with the supporting arm 166, a voice coil motor means 172 is provided for rotating the supporting arm 166.

The rotor 104 has a hub main body 110 and a yoke member 112 which is mounted to this hub main body 110, and the hub main body 110 is provided with a disk table 114 which is projecting outward in the radial direction. A recording disk 115 is attached to the disk table 114 of the hub main body 110 as illustrated.

A fluid dynamic pressure bearing 116 is provided between the housing 102 and the rotor 104. The fluid dynamic pressure bearing 116 shown in the figure is comprised of a shaft member 118 and a sleeve member 120 which is relatively rotatable to this shaft member 118. The sleeve member 120 is supporting a cylindrical shaft main body 119 and one end of the shaft main body 119 is fixed to the housing 102. At the other end of this shaft main body 119, a disk shape thrust plate 121 is provided in one united body with it. In this embodiment, the sleeve member 120 is comprised of the inner surface of the hub main body 110 and a cover member 122 mounted on the top of this hub main body 110, and the inner surface of the hub main body 110 and the cover member 122 cover the shaft main body 119 and the thrust plate unit 121.

The rotor 104 is supported rotatably by the shaft member 118. In the embodiment, a pair of radial fluid dynamic pressure bearing means 124 and 126 are provided between the outer surface at the intermediate portion of the shaft main body 119 (the region lower than the thrust plate 121) and the inner surface of the sleeve member 120 with a space left in the axial direction. These radial fluid dynamic pressure bearing means 124 and 126 are comprised of radial fluid dynamic pressure grooves formed on the inner surface of the sleeve member 120. Further, a pair of thrust fluid dynamic pressure bearing means 128 and 130 are provided between both surfaces of the thrust plate portion 121 and regions of the sleeve member 120 opposing to these both surfaces (the region of the hub main body 110 opposing to the lower surface of the thrust plate 121 and the lower surface of the cover member 122). The thrust fluid dynamic pressure bearing means 128 and 130 are comprised of, for instance, herringbone thrust fluid dynamic pressure grooves (not shown) formed on both surfaces of the thrust plate. These thrust fluid dynamic pressure grooves may be formed on the inner surface of the sleeve member 120 instead of the thrust plate 121. In this embodiment, lubricating oil is successively supplied to fill from one end to the other end of the shaft main body 119 through a pair of radial fluid dynamic pressure bearing means 124 and 126 as well as a pair of thrust fluid dynamic pressure bearing means 128 and 130.

The housing 102 is provided with a cylindrical wall 132. One end of this cylindrical wall 132 is extending to a part of the perimeter of the sleeve member 120 and a stator 134 is mounted on its outer surface. A rotor magnet 136 is mounted on the inner surface of the yoke member 112 opposing to the stator 134.

The fluid dynamic pressure bearing 116 is further provided with a lubricating oil retaining channel. In the embodiment, this retaining channel is comprised of a hole 142 provided at one end of the shaft main body 119, a communicating hole 142 penetrating the shaft main body 119 through this hole 142 and a bar-shape member 146. The hole 142 is extending through the center of the shaft main body 119 along the axial direction and its one end opens to the outside from the lower end surface of the shaft main body 119. Further, the communicating hole 144 is extending vertically substantially in the axial direction and its both ends open between a pair of radial fluid dynamic pressure bearing means 124 and 126.

In the hole 144, the bar-shape member 146 is provided as a filling member. The bar-shape member 146 has a circular cross-section, and its base is fixed to the shaft main body 119 and its free end is extending to near the opening at one end. Between the free end of the bar-shape member 146 and the open end of the hole 142, there is provided a large cross-section having the relatively large cross-section and the gap larger than that of the fluid retainer to retain fluid likewise the embodiment shown in FIG. 1. Oil is retained in the inner space of the communicating hole 144 and the space between the inner surface of the shaft main body 119 and the outer surface of the bar-shape member 146 by the capillarity, and the large cross-section of the outside acts to separate air bubbles generated in oil into air and oil so as to avoid the oil level from reaching the opening. The free end of the bar-shape member 146 was tapered in the same manner as shown in FIG. 3 to provide the similar action and effect as in FIG. 3. The bar-shape member shown in FIG. 1, 4 or 5 may be used instead of the bar-shape member 146 shown in FIG. 6.

A lid member 148 is provided on the surface of one end of the shaft member 118. This lid member 148 may be a lid member similar to that shown in FIG. 1 and allows air to pass through but does not allow oil to pass through substantially.

In case of a disk driving apparatus equipped with a motor in the construction as described above, as a retaining channel is provided on the shaft member 118 to retain oil by the capillarity, the same action and effect as the embodiment shown in FIG. 1 are achieved. That is, if oil in the thrust fluid dynamic pressure bearing means 128, 130 and/or the radial fluid dynamic pressure bearing means 124, 126 decreased, oil retained in the retaining channel is supplied to the thrust fluid dynamic pressure bearing means 128, 130 and/or the radial fluid dynamic pressure bearing means 124, 126 having a more fine gap through the oil communicating hole 144. Further, excess oil filled when a motor was manufactured, is retained in this retaining channel and used as replenishing oil. In addition, if oil decreases remarkably, it is possible to supply new oil to the retaining channel by removing the lid member 148. In particular, as one end of the retaining channel opens to the outside of a disk chamber, that is, the outside of the disk assembly accommodating the magnetic head means 170, the magnetic disk 115, etc., it is possible to supply lubricating fluid while keeping the disk chamber 160 in the substantially hermetically sealed state, which must be kept clean. Further, in this embodiment, to assure automatic oil supply, needless to say, it is important to set a gap of a space between the inner space of the communicating hole 144 and the space (the fluid retainer to retain lubricating oil) between the inner surface of the hole 142 and the outer surface of the bar-shape member 146 larger than the gap between the bearings of the thrust and the radial fluid dynamic pressure bearing means.

Further, in the embodiment shown in FIG. 6, the communicating hole 144 opens between a pair of the radial fluid dynamic pressure bearing means 124 and 126. However, the communicating hole 144 may be provided between a pair of the radial fluid dynamic pressure bearing means 124, 126 and a pair of the thrust fluid dynamic pressure bearing means 128 and 130, for instance, at the corner between the shaft main body 118 and the thrust plate 121 or between a pair of the thrust fluid dynamic pressure bearing means 128 and 130, for instance, on the outer surface of the thrust plate 121.

Figure 7:
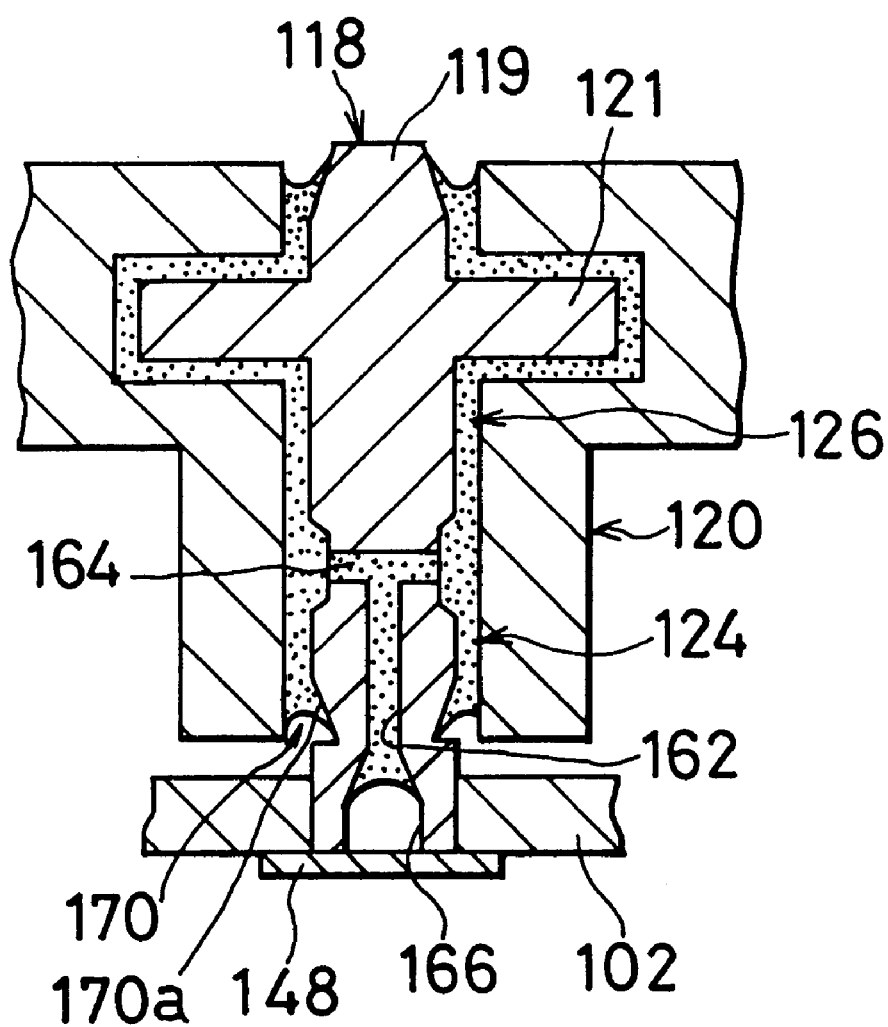
FIG. 7 is a cross-sectional view showing a fluid dynamic pressure bearing according to the present invention and a part of another embodiment of a motor adopting this bearing.

FIG. 7 shows another embodiment of a motor. In the embodiment shown in FIG. 7, oil is retained in the retaining channel by the taper seal effect. Further, in FIG. 7, the same component items shown in FIG. 8 will be explained by assigning the same reference numerals.

In FIG. 7, the shaft member 118 is provided with a hole 162 at its center, which is extending from one end in the axial direction and a communicating hole 164 extending substantially vertically to the axial direction is provided at the other end of the hole 162. The hole 162 and the communicating hole 164 themselves comprise an oil retaining channel without a filling member inserted and one end of this retaining channel opens at one end surface of the shaft member 118 and its other end opens between a pair of the radial fluid dynamic pressure bearings 124 and 126. Further, the fluid dynamic pressure grooves of the radial fluid dynamic pressure bearing means 124 and 126 are formed on the inner surface of the sleeve member with a space left in the axial direction.

In this embodiment, a taper portion 166 is provided at the opening of the hole 162. The cross-section of this taper portion 166 is gradually increasing outward (the downward in FIG. 7) and acts as a taper seal on oil retained in the hole 162. Even when the taper portion 166 is thus provided, there is a large cross-section having a space larger than that of the fluid retaining channel at the outside of the taper portion 166 and air bubbles, etc. contained in oil are separated into air and oil and the separated oil only is discharged to the outside of the motor through the opening. Further, in the opening of the hole 162, the lid member 148 is provided likewise the embodiment shown in FIG. 1.

In such motor, a lubricating oil retaining channel is also provided on the shaft member 118 and as oil is retained in this retaining channel by the capillarity, the same action and effect as shown in FIGS. 1 and 6 are achieved. Further, as the taper portion 166 is provided at one end of the hole 162, oil leakage is prevented. Further, in this embodiment it is also important to set the inner diameter (a gap in the oil retaining portion to retain fluid) of the hole 162 and the communicating hole 163 larger than the gap between the bearings of the thrust and the radial fluid dynamic pressure bearing means so that oil is automatically supplied.

With the structure shown in FIGS. 7 and 8(*a*), tapers 170*a* with a taper angle of, for example, 10 to 30 degrees are formed at both end portions of the shaft member 118, even at those portions facing the sleeve member 120. A tapered portion 170, which comprises the tapers 170*a* and a surface opposing a sleeve portion 120*a*, serves as a tapered seal for the oils of the radial hydrodynamic bearings 124 and 126.

The tapers 170*a* may be provided at the sleeve portion 120. Even when the tapered portion 170 is provided as shown in FIGS. 7 and 8(*a*), the flow-out force in the radial direction may act on the oil during the rotation of the sleeve portion 120, which will enhance the migration of the oil.

More specifically, when the shaft member 118 is fixed and the sleeve portion 120 rotates, large centrifugal force Fa acts on that portion of the lubricating oil which is close to the sleeve portion 120 while small centrifugal force Fb acts on that portion of the lubricating oil which is close to the shaft member 118, as shown in FIG. 8(*b*). Therefore, the oil spreads downward below the sleeve portion 120 as indicated by the alternate long and two dashes line.

When the shaft member 118 rotates and the sleeve portion 120 is fixed, on the other hand, small centrifugal force Fc acts on that portion of the lubricating oil which is close to the sleeve portion 120 while large centrifugal force Fd acts on that portion of the lubricating oil which is close to the shaft member 118, as shown in FIG. 8(*b*). In this case too, therefore, the oil spreads downward below the sleeve portion 120 as indicated by the alternate long and two dashes line.

As a solution to those problems, means for preventing the migration of the lubricating oil due to the centrifugal force, for example, a circumferential groove 171 as shown in FIG. 8(*d*), should be formed at the tapered portion 170. The oil which has spread downward when the motor rotates is retained in the groove 171 and is prevented from flowing out by a step 172. When the motor stops, the oil is held by the capillary phenomenon at the tapered portion 170 as indicated by the solid line in FIG. 8(*b*) or FIG. 8(*c*). The sufficient depth of this step 172 would be in a range of 30 to 50 µm.

It is more preferable that the only the step 172, and no groove 171, should be provided as shown in FIG. 8(*e*).

Figure 9A:
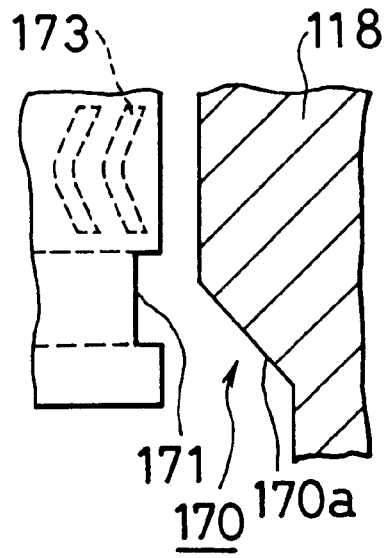
FIG. 9A is a diagram showing an example in which the migration prevention groove is used as an escape in working a radial hydrodynamic groove 172.
Figure 9B:
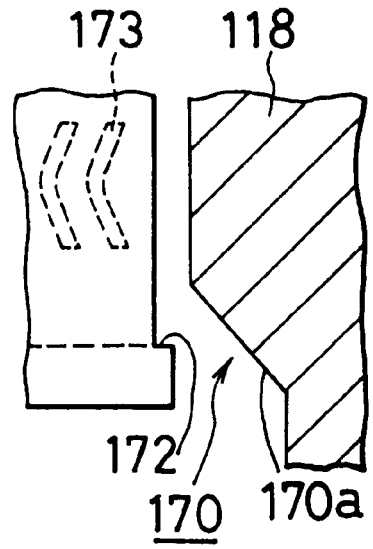
FIG. 9B shows a modification of the structure shown in FIG. 9A.

The groove 171 may be used as an escape at the time of processing a radial hydrodynamic groove 173 having, for example, a herringbone shape, as shown in FIG. 9(*a*).

Only the step 172, and no groove 171, may be provided as shown in FIG. 9(*b*).

Figure 10:
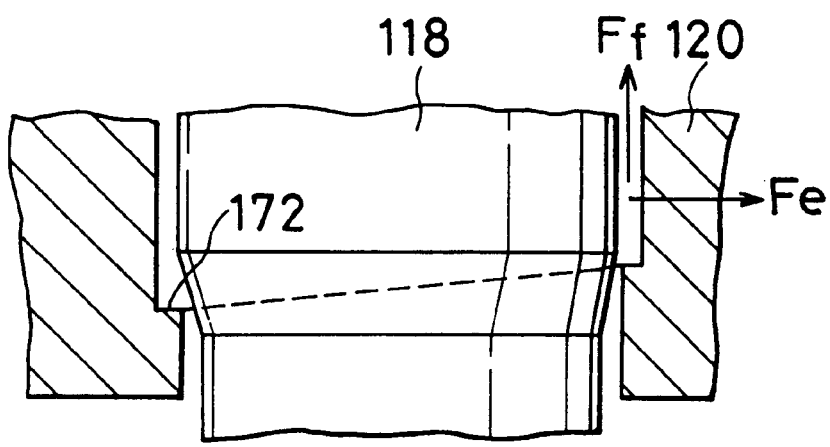
FIG. 10 is a diagram showing an inclined migration prevention step.

A spiral inclination may be provided at the step 172, so that the centrifugal force Fe to act on the oil and the rotation of the step 172 cause the opposite force Ff to the flow-out force to act on the oil to thereby prevent the migration of the oil as shown in FIG. 10. The direction and angle of the inclination of the step 172 are properly adjusted by controlling the rotational direction, rotational speed and the like of the motor.

Preferred embodiments of a fluid dynamic pressure bearing and a motor using this fluid dynamic pressure bearing according to the present invention have been explained in the above. The present invention is not limited to these embodiments but may be embodied in various modified forms without departing from the spirits and scope thereof.

In the fluid bearing means of the present invention, as a lubricating fluid retaining channel is provided to retain lubricating fluid by the capillarity, this retaining channel functions as a fluid reservoir and excess lubricating fluid is retained in this retaining channel. Further, if lubricating fluid decreases in the fluid dynamic pressure bearing means, the lubricating fluid retained in the retaining channel is automatically supplied by the capillarity, preventing seizure due to decrease of lubricating fluid.

Further, in a motor and a disk driving apparatus according to the present invention, as a lubricating fluid retaining channel is provided to retain lubricating fluid by the capillarity, this retaining channel functions as a fluid reservoir and excess lubricating fluid filled when manufacturing a motor is retained in the retaining channel. Further, if lubricating fluid decreases in the fluid dynamic pressure bearing means, lubricating fluid retained in the retaining channel is supplied to the fluid dynamic pressure bearing means by the capillary action, seizure of the bearing means due to decrease of lubricating fluid is prevented. In addition, as the retaining channel partially opens to the atmosphere, it becomes possible to supply lubricating fluid in the retaining channel through this opening.

Further, according to the hydrodynamic bearing means of this invention, the migration prevention means can prevent the lubricating fluid from flowing out, so that the burning of the bearing by the reduction in the lubricating fluid can be prevented.

What is claimed is:

1. A fluid dynamic pressure bearing comprising:

a shaft member having an outer bearing surface;

a sleeve member having an inner bearing surface and rotatable relatively to said shaft member, said shaft member being surrounded by the sleeve member with the outer bearing surface of the shaft member confronting the inner bearing surface of the sleeve member with a gap therebetween; and lubricating fluid filled in the gap, at least one of the inner and outer bearing surfaces being formed with a bearing groove for generating a dynamic pressure in said lubricating fluid during the relative rotation of the shaft member and the sleeve member, said outer surface of the shaft member being inclined to form a tapered seal at one end portion of the gap where the gap communicates with outside atmosphere, and the portion of the inner surface of the sleeve member opposing the inclined surface being formed with an annular stepped portion for trapping fluid migration over the opposing surface.

2. The fluid dynamic pressure bearing according to claim 1, wherein said annular stepped portion is formed by an annular groove.

3. The fluid dynamic pressure bearing according to claim 1, wherein said annular stepped portion is formed by an annular projection.

4. The fluid dynamic pressure bearing according to claim 1, wherein said annular stepped portion has a spiral inclination.

5. The fluid dynamic pressure bearing according to claim 3, wherein said annular projection has a spiral inclination.

6. The fluid dynamic pressure bearing according to claim 1, wherein the stepped portion is formed on the opposing surface at a position which the lubricating fluid in the gap reaches by migration due to centrifugal force, with the lubricating fluid being continuous with its main body.

* * * * *